May 10, 1966 E. S. HANNIS 3,249,965
ADJUSTABLE DIES FOR EXTRUDING APPARATUS
Filed Nov. 7, 1963 2 Sheets-Sheet 1

INVENTOR
E. S. HANNIS
By
ATTORNEY

May 10, 1966  E. S. HANNIS  3,249,965
ADJUSTABLE DIES FOR EXTRUDING APPARATUS
Filed Nov. 7, 1963   2 Sheets-Sheet 2
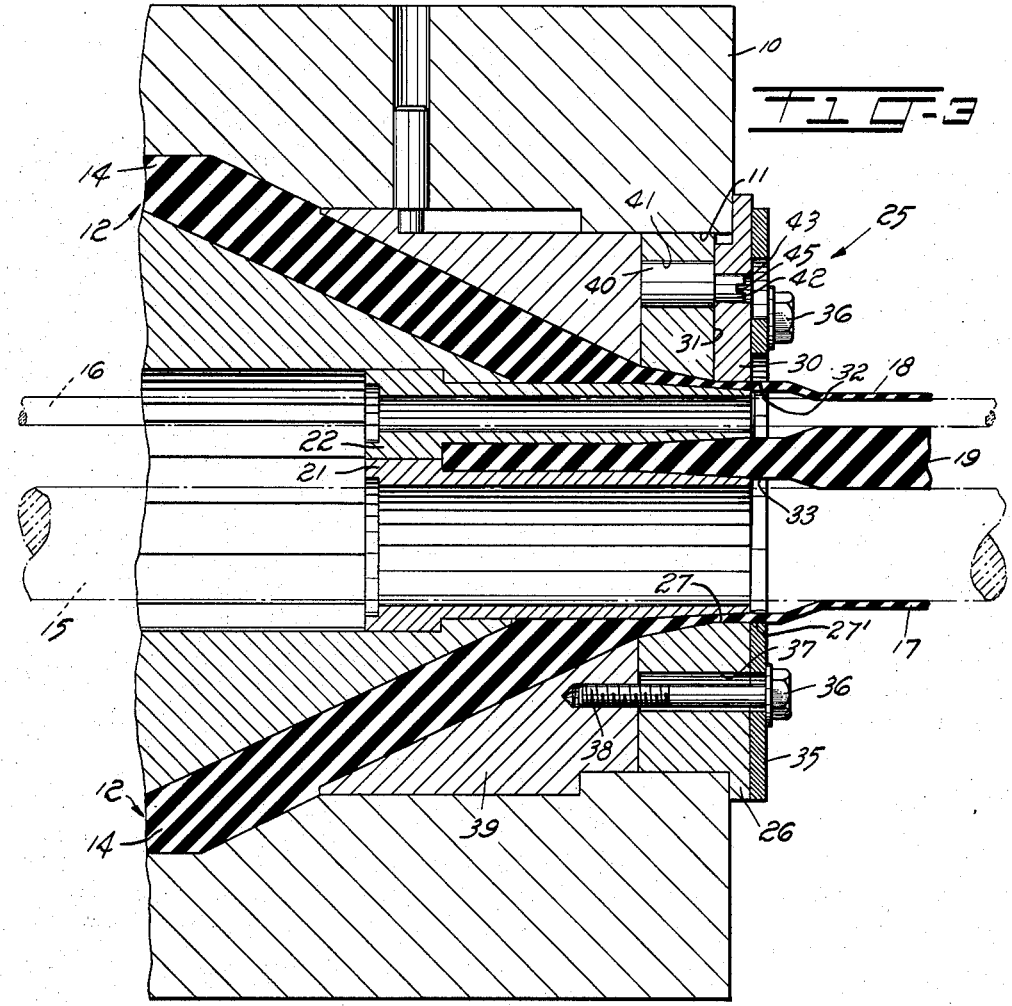
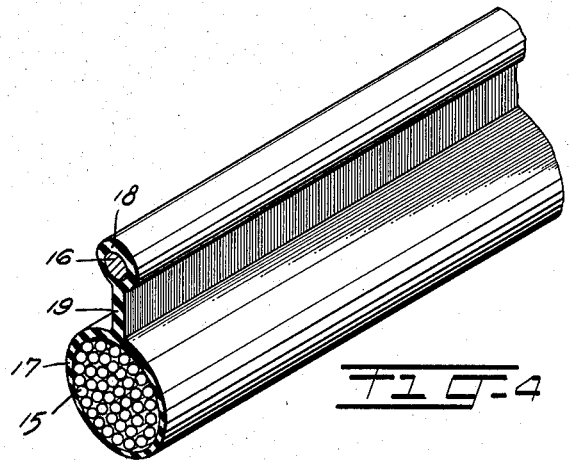

United States Patent Office 3,249,965
Patented May 10, 1966

3,249,965
ADJUSTABLE DIES FOR EXTRUDING APPARATUS
Eugene S. Hannis, Hoboken, N.J., assignor to Western Electric Company, Incorporated, New York, N.Y., a corporation of New York
Filed Nov. 7, 1963, Ser. No. 322,178
6 Claims. (Cl. 18—13)

This invention relates to adjustable dies for extruding apparatus, particularly apparatus for extruding sheaths about the cable core and support strand of a self-supporting cable.

In extruding plastic sheaths about cable cores and supporting strands therefor simultaneously with a web of plastic material connecting the sheaths, there is found to exist a problem in attaining perfect concentricity of the sheaths about their respective axes.

The object of the invention is to solve these problems by providing dies which may be adjusted relative to the paths of the cable core and the support strand.

In accordance with the above object the invention is embodied in an apparatus for extruding spaced plastic sheaths and a connecting web for a cable core and a support strand moving through fixed core tubes of an extruder head. The apparatus comprises an extrusion die including a main member movably positioned in the extruder head and provided with a die opening for the cable sheath and an element having a die opening for the supporting strand sheath and a corresponding opening for the web, said element being adjustable relative to the main member.

Other objects and advantages will be apparent from the following detailed description when considered in conjunction with the accompanying drawings wherein:

FIG. 3 is a vertical sectional view taken along the line 3—3 of FIG. 1; and

FIG. 4 is an isometric view of a portion of the finished product.

Figure 1:
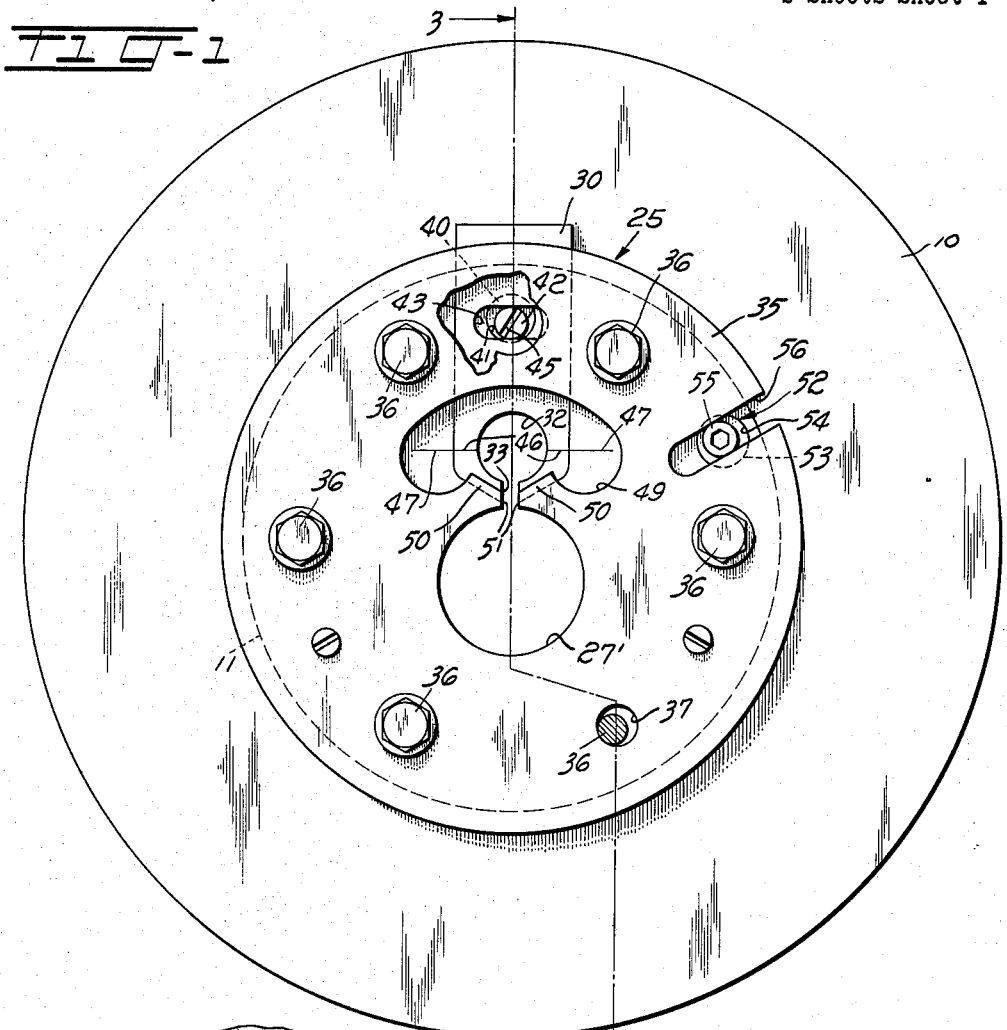
FIG. 1 is an end view of an extruding apparatus embodying the invention.

In FIG. 3, a portion of an extruding apparatus is shown including an extruding head 10 recessed at 11 and provided with passageways 12 for a material 14 to be extruded about a cable core 15 and a support strand 16 in the form of sheaths 17 and 18, respectively. The apparatus also extrudes a connecting web 19 joining the sheaths 17 and 18. The head 10 is provided with a fixed position core tube 21 for the cable core 15 and a fixed position core tube 22 for the support strand 16 which extend outwardly through the exit end of the extrusion head 10 and the recess 11 therein.

The important features of the apparatus are centered about an adjustable die indicated generally at 25 and including a main member 26 circular in general contour and similar in size to the recess 11 in the head so that the member 26 may be rotatably adjusted in the recess. The member 26 is provided with a die opening 27 surrounding the outer end of the core tube 21 to cooperate therewith in controlling the formation of the sheath 17 about the cable core 15. A die element 30 is disposed for sliding movement in a recess 31 of the main member 26 and is provided with a die opening 32 into which the end of the core tube 22 extends in order to cooperate with the die opening 32 in forming the sheath 18 about the support strand 16. The die element 30 also includes a die opening 33 extending between the die openings 27 and 32 for forming the connecting web 19 between the core 15 and the support strand 16.

A cover-like clamp 35 is mounted against the outer face of the main member 26 by means of plurality of mounting screws 36 which extend through oversize apertures 37 in the main member 26 to engage the threaded apertures 38 in the inner head portion 39 of the apparatus. The oversize apertures 37 permit the operator to vary the position of the dies and the main member 26 in the recess 11 when the mounting screws 36 have been loosened sufficiently to allow for this adjustment.

Figure 2:
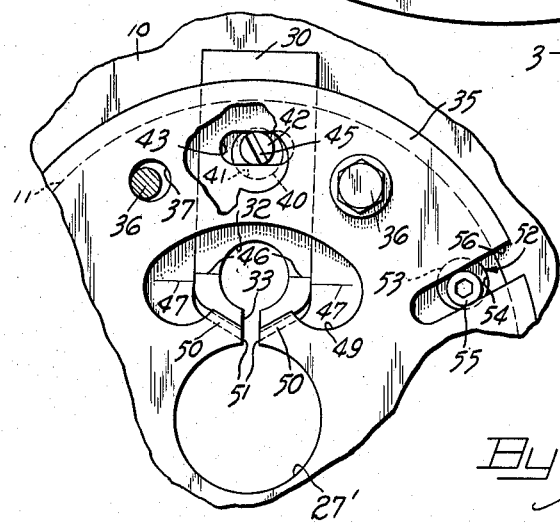
FIG. 2 is a fragmentary front elevational view of the structure shown in FIG. 1 illustrating different adjustments of that structure.

An eccentric actuator for the die element 30 includes a cylindrical member 40 rotatable in an aperture 41 of the main member 26 and having an integral eccentrically positioned member 42 disposed in an elongated aperture 43 of the die element 30. The member 42 is provided with a tool slot 45 serving when actuated to bring about varied adjustments of the element 30 relative to the member 26. These adjustments may be called vertical adjustments in that the die openings 32 may be moved vertically relative to the die opening varying in this instance, the height of the web 19 and the thickness of the upper and lower portions of sheath 18. To facilitate the vertical adjustment, lines 46 on the element 30, are aligned with lines 47 on the adjacent surfaces of the main member 26 when the die element 30 is in its lowermost position. The die element 30 is shown in its uppermost position in FIG. 2. The clamp 35 is provided with an opening 49 to permit observation of the die opening 32 and the registration lines 46 and 47. Furthermore, portions 50 of the clamp 35 include inner surfaces 51 cooperating with the adjacent surfaces of the die cavity 33 for the web 19 in allowing an enlargement of the die cavity during location of the element 30 in any adjusted position away from its lowermost position shown in FIG. 1.

Another eccentric actuator, indicated generally at 52, includes a cylindrical portion 53 rotatably disposed in an opening 54 in the inner head-portion 39 and an outer eccentric portion 55 positioned in slot 56 in the main member 26 and the clamp 35. Rotation of this member 52 through the aid of a suitable tool will rock the main member about its center to bring about what may be defined as a horizontal adjustment of the dies, that is, the die openings 27 and 32 and opening 27' in the clamp 35 are moved horizontally while opening 27' is maintained in registration with the die opening 27.

*Operation*

The variable die in this type of extruding apparatus will be set initially at a selected position until test runs have been made after which adjustments may be made depending upon the positions of the sheaths 17 and 18. Naturally, perfect concentricity of these sheaths is desired and any variation from that condition may be corrected through the two adjustments, provided by the actuators 42 and 52. To bring about these adjustments the mounting screws 36 should be loosened, but not removed. The large aperture 37 about these screws permit movement of the main member 26 together with the clamp 35 through movement of the eccentric portion 55 of the actuator 52 in one direction or the other. The element 30 moves with the main member in this adjustment, yet it may be desirable to bring about further adjustment in the area of the web 19 or the sheath 18. This may be accomplished by rotating the eccentric portion 42 of the actuator in the elongated opening 43 to move the die opening 32 relative to the die opening 27 and the core tube 22. When these adjustments have been completed the mounting screws 36 are again tightened to retain the dies in their adjusted position.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for extruding a plastic sheath concentrically about the cable core and support strand of a self-supporting cable and a connecting web therebetween, the combination comprising:

a main die having an aperture extending therethrough for forming a sheath about the core and support strand and a connecting web therebetween during the passage of the core and support strand through the aperture, the main die having a slot formed therein extending transverse to the aperture, an adjustable die mounted in the slot of the main die and having an aperture extending therethrough to cooperate with the main die in forming the sheath about the support strand and in forming the connecting web, means for moving the main die in a first path to obtain sheath concentricity, and means for moving the adjustable die within the slot in a second path transverse to the first path to obtain sheath concentricity.

2. An apparatus in accordance with claim 1 wherein the means for moving the main die comprises:

an eccentric engaging the main die and rotatable to move the die in a predetermined path to obtain sheath concentricity.

3. An apparatus in accordance with claim 1 wherein the means for moving the adjustable die comprises:

an eccentric engaging the adjustable die to move said die within the slot to obtain sheath concentricity in a path transverse to the movement of the main die.

4. An apparatus in accordance with claim 1 wherein the main die comprises:

a body portion having an aperture extending therethrough, the walls of the aperture forming a passage for the sheath material to be applied about the support strand and cable core and form a connecting web therebetween, and a slotted portion engaged by the means for moving the main die.

5. An apparatus in accordance with claim 1 wherein the adjustable die comprises:

an elongated body mounted within the slot in the main die and having an aperture extending therethrough for positioning the moving means for said die and a lower slotted portion having the configuration of the sheathed support strand and connecting web to cooperate with the main die in forming a concentric cable sheath.

6. In an apparatus for extruding a plastic sheath concentrically about the cable core and support strand of a self-supporting cable and a connecting web therebetween, the combination comprising:

a main die having an aperture extending therethrough for forming a sheath about the core and support strand and a connecting web therebetween during the passage of the core and support strand through the aperture, the main die having a slot formed therein extending transverse to the aperture.

an adjustable die mounted in the slot of the main die and having an aperture extending therethrough to cooperate with the main die in forming the sheath about the support strand and in forming the connecting web, means for rotating the main die to move the adjustable die horizontally with respect to the support strand, and means for moving the adjustable die vertically within the slot.

References Cited by the Examiner
UNITED STATES PATENTS

| 1,350,722 | 8/1920 | Goodenberger | 18—12 |
| 2,720,679 | 10/1955 | Ratliff | 18—12 |
| 2,788,543 | 4/1957 | Dinsch | 18—12 |
| 3,074,107 | 1/1963 | Kiyoshi et al. | 18—13 |

WILLIAM J. STEPHENSON, *Primary Examiner.*

J. S. OVERHOLSER, *Examiner.*

L. S. SQUIRES, *Assistant Examiner.*